(12) United States Patent
Herwig et al.

(10) Patent No.: US 7,723,465 B2
(45) Date of Patent: May 25, 2010

(54) METHOD FOR PRODUCING POLYETHER ALCOHOLS

(75) Inventors: Stephan Herwig, Hassloch (DE); Thomas Ostrowski, Mannheim (DE); Dirk Meckelnburg, Ludwigshafen (DE); Achim Loeffler, Speyer (DE); Renata Jovanovic, Ludwigshafen (DE); Werner Weinle, Bad Friedrichshall (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 143 days.

(21) Appl. No.: 11/994,507

(22) PCT Filed: Jul. 11, 2006

(86) PCT No.: PCT/EP2006/064074
§ 371 (c)(1),
(2), (4) Date: Jan. 3, 2008

(87) PCT Pub. No.: WO2007/009905
PCT Pub. Date: Jan. 25, 2007

(65) Prior Publication Data
US 2008/0214778 A1        Sep. 4, 2008

(30) Foreign Application Priority Data
Jul. 18, 2005     (DE) .................. 10 2005 034 001

(51) Int. Cl.
*C08G 59/68* (2006.01)

(52) U.S. Cl. .................. 528/408; 528/403; 568/679

(58) Field of Classification Search .................. 528/403; 422/236, 234, 227
See application file for complete search history.

(56) References Cited

U.S. PATENT DOCUMENTS 4,705,535 A * 11/1987 Lipp .................. 48/77

FOREIGN PATENT DOCUMENTS

| DE | 203 735 | 12/1981 |
|----|---------|---------|
| EP | 1 469 027 | 10/2004 |
| JP | 06 016806 | 1/1994 |
| WO | 98 03571 | 1/1998 |
| WO | 01 62824 | 8/2001 |
| WO | 01 62825 | 8/2001 |
| WO | 01 62826 | 8/2001 |
| WO | 03 025045 | 3/2003 |

* cited by examiner

*Primary Examiner*—Randy Gulakowski
*Assistant Examiner*—Shane Fang
(74) *Attorney, Agent, or Firm*—Oblon, Spivak, McClelland, Maier & Neustadt, L.L.P.

(57) ABSTRACT

The invention provides a process for continuously preparing polyether alcohols using DMC catalysts, which comprises, in a first step, in a continuous reactor, adding alkylene oxides onto H-functional starter substances and transferring the output of this reactor to a second step in a reactor which is divided by closed trays into mutually separate sections, known as compartments, which are connected to one another by external pipelines, in which the output of the reactor from the first step of the reaction passes through the compartments in succession.

20 Claims, 1 Drawing Sheet

METHOD FOR PRODUCING POLYETHER ALCOHOLS

Figure 1:
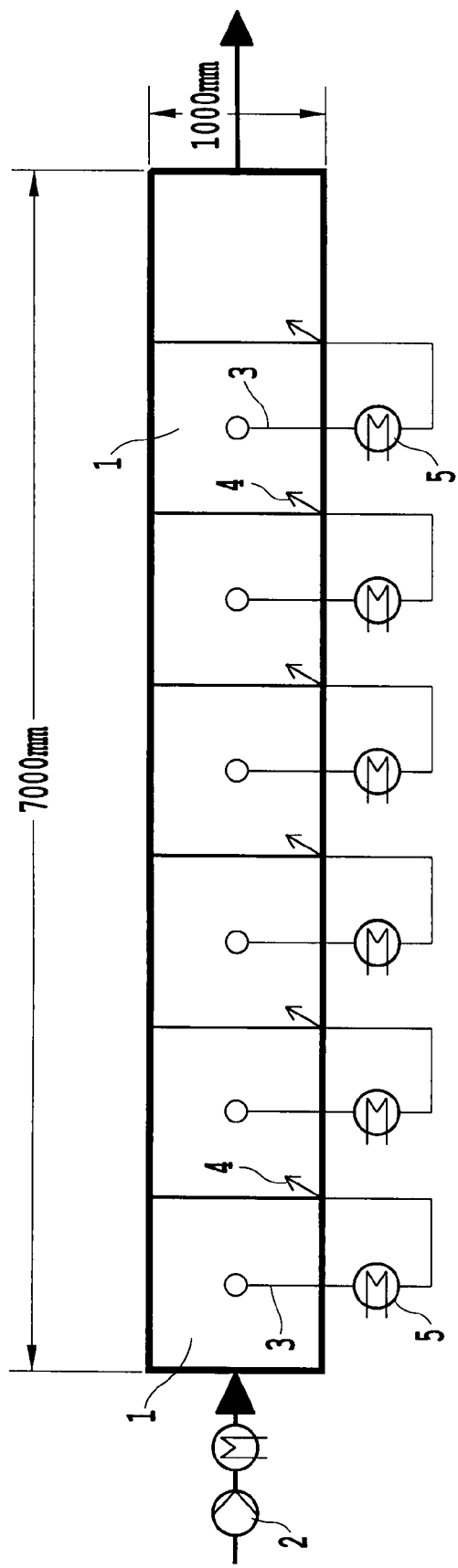

The invention provides a continuous process for preparing polyether alcohols by polymerizing alkylene oxides using multimetal cyanide compounds as catalysts.

Polyether alcohols have been known for some time and are prepared on the industrial scale in large amounts. They are usually used as a starting compound for preparing polyurethanes by reaction with polyisocyanates.

The catalysts used for preparing polyether alcohols in recent times have frequently been multimetal cyanide compounds, also known as DMC catalysts. The use of DMC catalysts minimizes the content of unsaturated by-products; moreover, the reaction proceeds, compared with the customary basic catalysts, with a distinctly higher space-time yield.

A further advantage of the DMC catalysts is so-called differential catalysis. This means that the alkylene oxides are added preferentially onto molecules with low molar mass in the reaction. This enables the continuous preparation of polyether alcohols in reactors with ideal mixing.

Processes for continuously preparing polyether alcohols using DMC catalysts are also known. For instance, WO 98/03571 describes a process for continuously preparing polyether alcohols by means of DMC catalysts, in which a mixture of a starter and a DMC catalyst is initially charged in a continuous stirred tank, the catalyst is activated, and further starter, alkylene oxides and DMC catalyst are added continuously to this activated mixture, and, on attainment of the desired fill level of the reactor, polyether alcohol is drawn off continuously.

JP H6-16806 describes a process for continuously preparing polyether alcohols by means of DMC catalysts, likewise in a continuous stirred tank or in a tubular reactor, in which an activated starter substance mixture is initially charged at the inlet and alkylene oxide is metered in at various points in the tubular reactor.

DD 203 725 too describes a process for continuously preparing polyether alcohols by means of DMC catalysts, in which an activated starter substance mixture is initially charged at the inlet in a tubular reactor and alkylene oxide is metered in at various points in the tubular reactor.

WO01/62826, WO01/62824 and WO01/62825 describe specific reactors for the continuous process for preparing polyether alcohols by means of DMC catalysts.

A problem in the continuous preparation of polyether alcohols using DMC catalysts is the presence of unconverted alkylene oxide in the output of the continuous reactors. These are usually removed from the polyether alcohol by stripping.

Especially in the industrial scale preparation of polyether alcohols, this results in considerable product losses which impair the economic viability of the process.

To remedy this deficiency, WO 03/025045 proposes passing the output from the continuous reactor through a tubular reactor in which no alkylene oxide is metered in. At the end of this tubular reactor, the free alkylene oxide has reacted to completion and the resulting polyether alcohol is substantially monomer-free.

A disadvantage of this process is that the tubular reactor to ensure the conversion of all of the free alkylene oxide has to be very long. Moreover, the mixing in the tubular reactor is frequently insufficient. The heat removal performance of a tubular reactor is not sufficient to prevent temperature peaks which lead to product damage in the first section with high alkylene oxide concentrations.

In order to keep the temperature in the tubular reactor constant, cooling is necessary especially in the foremost part of the reactor, so that the product is not damaged owing to the increase in temperature.

The necessary residence times are also very high, so that ensuring plug-flow behavior, which has the consequence of small reactor diameter, results in very long reactors.

Another disadvantage of this process is that optimal fluid-dynamic design of the tubular reactor is often impossible. In order to ensure the reaction of all of the free alkylene oxide, a certain hydrodynamic residence time is required. This is made available by virtue of a sufficiently large volume. A large volume can be realized either by means of a high diameter or by means of a high length.

In a tube with high diameter, the flow rate is low. Once the flow goes below critical Reynolds numbers, low flow rates lead to axial backmixing and thus to undefined residence time distributions. The residence time distribution of the apparatus finally no longer corresponds to the ideal tube characteristics required for the reaction. Moreover, the specific impulse input falls with the flow rate; the dispersion of particles becomes increasingly worse.

When the required reaction volume, in contrast, is realized over a high tube length, this can give rise to construction difficulties. When, for example, temperature differences are expected in axial direction in the tube, it is possible to prevent demixing only in a vertical design.

It was an object of the invention to develop a process for continuously preparing polyether alcohols using DMC catalysts, in which the losses of alkylene oxide are minimized, which can be designed in a compact manner and which operates with operational safety.

The object is surprisingly achieved by the use of a reactor which is divided by plates sealed with respect to one another into mutually separate sections, known as compartments, which are connected to one another by external pipelines, downstream of the continuous reactor.

The invention accordingly provides a process for continuously preparing polyether alcohols using DMC catalysts, which comprises, in a first step, in a continuous reactor, adding alkylene oxides onto H-functional starter substances and transferring the output of this reactor to a reactor which is divided by plates sealed with respect to one another into separate sections, known as compartments, which are connected to one another by external pipelines, in which the output of the reactor from the first step of the reaction passes through the compartments in succession.

This second reactor will be referred to hereinafter as a compartment reactor. It is preferably cylindrical, the length of the apparatus being greater than the diameter. The apparatus may have either a horizontal or a vertical design. The dividing walls are preferably arranged at right angles to the vessel wall in the cylinder. The individual compartments preferably have the same volume.

In this reactor, apart from the alkylene oxide present in the output of the reactor from the first step of the process, usually no alkylene oxide is metered in, so that there is full depletion there of the alkylene oxide present in the output of the reactor from the first step of the process. However, it is also possible in principle to meter alkylene oxide into this reactor, for example in order to add on another alkylene oxide or another mixture of alkylene oxides to the chain end than in the preceding continuous reactor.

When further alkylene oxide is metered into the compartment reactor, this should be done at the start of the reactor in order to ensure the full depletion of the alkylene oxide.

In the simplest case, the compartment reactor may comprise two compartments. The compartment reactor preferably has at least 2 and not more than 10 compartments. In particular, the compartment reactor has from 4 to 10 compartments. The number and the volume of the compartments is such that full depletion of the unconverted alkylene oxide is ensured and the product leaving the compartment reactor is free of unreacted alkylene oxide.

The reactants are transferred via pipelines from one into the next compartment in each case. At the end of each pipeline, i.e. at the inlet of each compartment, the feed pipe can be narrowed in nozzle-like form. When the reactants are introduced into the compartment via one nozzle or else a plurality of nozzles, energy is introduced into the particular compartment. This energy can be utilized for mixing of the fluids in the compartments. In this arrangement, each nozzle generates a pressure drop of between 1 mbar and 10 bar. Thus, a specific energy between 0.5 W/m³ and 3000 W/m³ is introduced into each compartment. This is calculated by the following formula:

$$\frac{P}{V} = \Delta p_{nozzle} \cdot \dot{V}$$

where P/V=specific energy,
$\Delta p_{nozzle}$=Nozzle pressure drop
$\dot{V}$=Volume flow rate of the liquid When nozzles or nozzle-like pipe narrowings are used, it is particularly advantageous to arrange them as close as possible to the plate in each compartment. The nozzle jet should be directed vertically or obliquely upward.

On completion of mixing, the liquid is withdrawn again from the compartment and fed to the next compartment, for example via a nozzle, through a tube inserted centrally into each compartment or else through a distributor ring or the like. Downstream of the last compartment, the polyether alcohol, if appropriate after workup, is fed to the storage tank. Before the use of the polyether alcohols, it is customary to add to them customary stabilizers against thermal and oxidative degradation.

Each compartment has the residence time characteristics of a stirred tank. The entire compartment reactor has the residence time distribution of a stirred tank battery. Compared to a stirred tank battery, the compartment reactor has the particular advantage that it does not need any moving parts. As a result, a very simple construction and compact design of the reactor is possible.

The polyether alcohol withdrawn from the continuous reactor is preferably forced through all compartments by a single pump at the inlet of the reactor. It is also possible to install pumps between individual compartments.

In the case of use of a single pump at the reactor inlet, this has to accommodate the entire pressure drop of the reactor. As a result, the pressure in the first compartment is the highest in this case. This is advantageous since the largest amount of free alkylene oxide which is to be depleted in the compartment reactor is expected here. In this embodiment, the reactor can be designed such that the formation of a continuous gas phase is prevented.

The compartments are connected to one another by external pipelines. Heat exchangers, for example tube bundle or plate heat exchangers, may be installed in these external pipelines. By means of the heat exchangers, the temperature in the compartments can be adjusted. In this case, the temperature in all compartments can be set at the same level or differently in the different compartments.

The reactor may be operated adiabatically, isothermally or polytropically. The adiabatic reaction constitutes the simplest realization, since the external heat exchangers are not necessary in this case. Instead, the products are merely passed around the outside. The reaction temperature will rise within the reactor and achieve its maximum at the end of the reactor. In the isothermal case, external heat exchangers ensure that the temperatures in all compartments are identical. The polytropic reaction constitutes an intermediate case of the two abovementioned extremes.

In the present case, adiabatic temperature control is possible in principle. However, it has to be ensured that the maximum permissible product temperature (approx. 150° C.) is not exceeded at the end of the reactor. When a product inlet temperature of approx. 130° C. and an adiabatic temperature increase through the depletion of the propylene oxide of approx. 7 K/%$_{PO}$ is assumed, the result is that not more than approx. 3% of unreacted propylene oxide may be present in the reaction mixture. When this value is exceeded, product cooling has to take place. The concentration of unreacted alkylene oxide depends upon the reaction in the preceding reactor, such as catalyst concentration, residence time and/or reaction temperature.

In a particular embodiment of the reactor, the first compartments may be equipped with heat removal systems; in contrast, the remaining compartments may be operated adiabatically.

As detailed, the compartments are divided from one another by sealed plates. For filling and emptying, the plates may be provided with small holes. It is also possible to install pipelines as bypasses between the compartments. In order to ensure operation as intended via the external heat exchangers and the nozzles, the pressure drop in these holes or bypasses has to be large or the cross-sectional area small compared to those of the compartment nozzles.

The compartment reactor may be operated in horizontal or vertical form. In vertical operation, the polyether alcohol may be operated from the bottom upward or from the top downward. A horizontal apparatus is also possible.

In the case of vertical operation, the occurrence of a continuous gas phase in the reactor has to be prevented. This would lead to flooding of the reactor with gas. This risk does not exist in a horizontal apparatus.

FIG. 1 shows a compartment reactor which consists of 7 compartments (1). The reactor is circular and has a length of 7000 mm and a diameter of 1000 mm. The polyether alcohol is conveyed into the first compartment (1) by means of a pump (2). Via an external tube (3) inserted centrally into each compartment, a polyether alcohol, on completion of mixing, is withdrawn again from the compartment, conveyed into the next compartment in each case and sprayed in by means of a nozzle (4). Heat exchangers (5) are mounted on the external tubes. At the end of the reactor, the polyether alcohol is withdrawn from the reactor.

The alkylene oxide can be added on continuously in the first stage of the process by known processes.

The reactors used for the first stages of the process may be continuous stirred tanks, tubular reactors or flow reactors or loop reactors.

Such reactors are described, for example, in JP H6-16806, DD 207 253, WO 01/62826, WO 01/62825 and WO 01/62824.

In a preferred embodiment of the process according to the invention, continuous stirred tanks are used in the first stage of the process. Preference is given to using a stirred tank with external heat exchanger, as described, for example, in WO 01/62825.

WO 01/62824 describes a stirred tank reactor with internal heat exchanger plates. It is also possible to use this reactor type.

In addition to conventional stirred tank reactors, it is also possible to use jet-loop reactors with gas phase and external heat exchangers, as described, for example, in EP 419419, or internal heat exchanger tubes as described in WO 01/62826. It is also possible to use gas phase-free loop reactors.

In the metering of the reactants, good distribution of the reactants, i.e. of the alkylene oxide, starter and catalyst suspension, is necessary. In the case of stirred tank reactors, this can be done by the use of ring distributors which are installed below the stirrer or between the first and the second stirrer plane.

In the process according to the invention, the starter substance, the alkylene oxide and the catalyst are typically metered continuously into the reactor and the reaction product is withdrawn continuously. Afterward, as detailed, it is fed continuously to the compartment reactor by means of a pump.

In one embodiment of the process according to the invention, the first continuous reactor is followed downstream by at least one further continuous reactor. In this reactor, a different alkylene oxide or a different mixture of at least two alkylene oxides is preferably added on than in the first continuous reactor. The output from this second reactor is, as described above, fed to the compartment reactor.

After being withdrawn from the compartment reactor, the product is typically worked up. The workup includes, for example, the removal of volatile constituents, typically by vacuum distillation, steam stripping or gas stripping and/or other methods of deodorization. If necessary, a filtration can also be effected. Volatile secondary components can be removed either batchwise or continuously. In the present process, preference is given to continuous removal of odorants. This can be done, for example, by means of steam stripping in a column with downstream forced-circulation evaporator to remove the residual water.

It is possible to remove the catalyst from the finished polyether alcohol, especially by filtration. However, for most fields of use, it can remain in the polyether alcohol.

It is also customary to stabilize the polyether alcohol against thermooxidative degradation. This is usually done by the addition of stabilizers, preferably sterically hindered phenols and/or amines. To reduce the odor of the polyols, it is possible to dispense with the use of aminic stabilizers.

The starter substances used to prepare the polyether alcohols are H-functional compounds. In particular, alcohols having a functionality of from 1 to 8, preferably from 2 to 8, are used. To prepare polyether alcohols which are used for flexible polyurethane foams, the starter substances used are especially alcohols having a functionality of from 2 to 6, especially of 2 and 3. Examples are glycerol, diglycerol, butanediol, diethylene glycol, triethylene glycol, dipropylene glycol, tripropylene glycol, sorbitol, trimethylolpropane and castor oil. In the case of addition of the alkylene oxides by means of DMC catalysts, it is advantageous to use their reaction products with alkylene oxides, especially propylene oxide, together with or in place of the alcohols mentioned. Such compounds preferably have a molar mass up to 500 g/mol. In the preparation of these reaction products, the alkylene oxides can be added on with any catalysts, for example with basic catalysts. The polyether alcohols for the preparation of flexible polyurethane foams usually have a hydroxyl number in the range between 5 and 400 mg KOH/g, preferably 35 and 60 mg KOH/g.

The alkylene oxides are added on in the first stage of the process under the customary conditions, at temperatures in the range from 60 to 180° C., preferably between 90 to 140° C., in particular between 100 to 130° C., and pressures in the range from 0 to 20 bar, preferably in the range from 0 to 10 bar and in particular in the range from 0 to 5 bar. The two process steps of the process according to the invention may be performed at identical or different temperatures. The mixture of starter substance and DMC catalyst initially charged at the start of the reaction can, before the start of metering of the alkylene oxides, be pretreated by stripping in accordance with the teaching of WO 98/52689.

The DMC catalysts used for the process according to the invention are known and are described, for example, in EP 743 093, EP 755 716, EP 862 947, EP 862 997 or EP 1 021 453. The catalysts may be amorphous or crystalline. Among the crystalline DMC catalysts, preference is given to those having a monoclinic crystal structure.

The catalyst is used preferably in an amount of from 15 to 100 ppm, in particular in an amount of from 20 to 80 ppm, based in each case on the total mass of the polyether alcohol.

As detailed, the polyether alcohols prepared by the process according to the invention are preferably used for preparing polyurethanes, especially for preparing flexible polyurethane foams. To this end, they are reacted with polyisocyanates, if appropriate in a mixture with other compounds having at least two hydrogen atoms reactive with isocyanate groups and in the presence of catalysts, blowing agents and, if appropriate, customary assistants and/or additives.

The invention will be illustrated in detail using the example which follows.

The above-described invention will be described using the example which follows.

EXAMPLE a) Catalyst Preparation

First, a glycerol-started propoxylate was prepared by known KOH technology. A 30 l reactor was initially charged with 1.85 kg of glycerol. Subsequently, 125 g of aqueous KOH (48%) were metered in and the reaction mixture was freed of water at 120° C. under reduced pressure (water value: <0.9%). Subsequently, 18.1 kg of propylene oxide were metered in at 120° C. within 8 hours. The product was subsequently worked up at 90° C. with Macrosorb (5% Macrosorb, 1% water) and the Macrosorb was subsequently filtered off. The product had an OH number of 171.5 mg KOH/g. No alkalinity was detectable (<1 ppm).

DMC catalyst prepared according to the teaching of EP 862947 was subsequently added to this propoxylate. The dried catalyst was suspended in the above-described propoxylate and distributed finely in the propoxylate using an Ultra-Turrax. Subsequently, the suspension was dried at 120° C. under reduced pressure (water value: <0.02%). The concentration of DMC in the suspension was 5.1% (determined via the Zn/Co contents).

b) Preparation of Starter Polyol

The propoxylate already described above (OH number 171.5 mg KOH/g) was converted to a flexible polyol foam in a semibatchwise reactor. This was charged with 5.6 kg of the propoxylate. Subsequently, 39 g of the DMC suspension were metered in. The reaction mixture was dried at 120° C. (water value<0.02%). Subsequently, 1.44 kg of ethylene oxide and 12.95 kg of propylene oxide were metered in at 120° C. in parallel. The end product had an OH number of 48.6 mg KOH/g.

c) Continuous Reaction

The apparatus for the continuous reaction consisted of a 1.5 l stirred tank reactor with jacket cooling. The reactor lid was equipped with feeds for alkylene oxides, starter (glycerol), DMC suspension and polyol (for the initial charge). All feeds were controlled by means of metering pumps. At the reactor outlet, a gear pump followed by a mass flow meter were used in order to remove the product continuously from the reactor and to keep the fill level in the reactor (approx. 80%, corresponding to liquid volume 1.2 l) constant. The stirred tank reactor was followed downstream by the inventive compartment reactor with total volume 0.8 l. The postreactor was divided into 7 compartments with a height of 53 mm in each case and had a diameter of likewise 53 mm (compartment H:D=1). In each compartment, a nozzle consisting of a 20 mm-long DN 6 pipe and a 2 mm-thick diaphragm with diameter 0.1 mm was installed. On the output side, a control valve which kept the pressure in the reactor constant was installed on the compartment reactor. The output vessel was an evacuated collecting vessel.

The plant was controlled by means of a process control system. The catalyst suspension prepared as described above was diluted to a concentration of 0.2%.

The stirred tank was charged with the above-described product (fill level 80%) and heated to 130° C. The compartment reactor was likewise heated to 130° C. Subsequently, the catalyst metering pump was switched on until there was a theoretical DMC concentration in the tank of approx. 150 ppm, and subsequently switched off again. All feeds and discharges were started simultaneously, the following metering rates having been set: glycerol: 32.8 g/h, ethylene oxide: 125 g/h, propylene oxide: 1091.7 g/h, catalyst suspension (0.2%): 25 g/h, corresponding to a mean residence time of 60 min in the CSTR.

The reaction started up spontaneously and steady-state reactor operation was achieved within 3 h (no change in the OH number of the reaction product in the collecting vessel). Samples from the end of the compartment reactor always had a content of propylene oxide of less than 200 ppm; the content of ethylene oxide was below the limit of detection.

What is claimed is:

1. A process for continuously preparing a polyether alcohol, the process comprising
    adding an alkylene oxide onto an H-functional starter substance in the presence of a double metal cyanide catalyst in a continuous reactor to form a product,
    transferring an output comprising the product from the continuous reactor to a second reactor, and
    reacting the product in the second reactor to form the polyether alcohol;
    wherein the second reactor is divided by sealed plates into mutually separate sections, known as compartments,
    wherein each individual compartment of the second reactor is directly adjacent to at least one other compartment,
    wherein, each compartment is individually connected to its adjacent compartment(s) by an external pipe,
    wherein the output of the continuous reactor passes through the compartments of the second reactor in succession via transfer through the external pipe(s), thereby resulting in formation of the polyether alcohol, and
    wherein the second reactor does not comprise moving parts.

2. The process according to claim 1, wherein no alkylene oxide is metered into the second reactor.

3. The process according to claim 1, wherein the output comprising the product from the continuous reactor is sprayed into a first compartment of the second reactor through a nozzle.

4. The process according to claim 1, wherein when the individual compartment is connected to the adjacent compartment by the external pipe, the external pipe is connected to the individual compartment through a tube inserted centrally into the individual compartment.

5. The process according to claim 1, wherein the output from the continuous reactor is successively forced through all compartments of the second reactor by a force generated by a single pump positioned at the inlet of the second reactor.

6. The process according to claim 1, wherein the second reactor comprises from 2 to 10 compartments.

7. The process according to claim 1, wherein the compartments have the same volume.

8. The process of claim 1, wherein the second reactor comprises from 4 to 10 compartments.

9. The process of claim 1, wherein the H-functional starter substance is an alcohol having a functionality of from 1 to 8.

10. The process of claim 1, wherein the H-functional starter substance is an alcohol having a functionality of from 2 to 8.

11. The process of claim 1, wherein the H-functional starter substance is an alcohol having a functionality of from 2 to 3.

12. The process of claim 1, wherein the H-functional starter substance is selected from glycerol, diglycerol, butanediol, diethylene glycol, triethylene glycol, dipropylene glycol, tripropylene glycol, sorbitol, trimethylolpropane, castor oil, and combinations thereof.

13. The process of claim 12, wherein the H-functional starter substance is glycerol.

14. The process of claim 1, wherein the double metal cyanide catalyst is amorphous or crystalline.

15. The process of claim 1, wherein the double metal cyanide catalyst is crystalline.

16. The process of claim 15, wherein the double metal cyanide catalyst has a monoclinic crystal structure.

17. The process of claim 1, wherein alkylene oxide is selected from ethylene oxide, propylene oxide, and combinations thereof.

18. The process of claim 17, wherein the alkylene oxide is a combination of ethylene oxide and propylene oxide.

19. The process of claim 1, wherein the polyether alcohol from the end of the compartment reactor has an alkylene oxide content of less than 200 ppm.

20. The process of claim 1, further comprising, after the reacting, filtering the polyether alcohol.

* * * * *